United States Patent [19]

Madsen

[11] Patent Number: 4,568,014
[45] Date of Patent: Feb. 4, 1986

[54] BONDING OF METALLIC GLASS TO CRYSTALLINE METAL

[75] Inventor: Brent W. Madsen, Carvallis, Oreg.

[73] Assignee: The United States of America as represented by the Secretary of Interior, Washington, D.C.

[21] Appl. No.: 537,187

[22] Filed: Sep. 29, 1983

[51] Int. Cl.⁴ ............................................. B23K 20/04
[52] U.S. Cl. .................................... 228/116; 228/209; 228/229; 228/235; 228/263.16
[58] Field of Search ............... 228/116, 190, 208, 209, 228/229, 235, 263.13, 263.15, 263.16

[56] References Cited

U.S. PATENT DOCUMENTS

| | | | |
|---|---|---|---|
| 2,390,452 | 12/1945 | Mudge | 228/263.13 |
| 2,484,118 | 10/1949 | Reynolds | 228/208 |
| 3,164,897 | 1/1965 | Patriarca | 228/209 |
| 3,173,202 | 3/1965 | Farber | 228/190 |
| 3,276,103 | 10/1966 | Kopke | 228/219 |
| 3,300,838 | 1/1967 | Slater et al. | 228/235 |
| 3,350,773 | 11/1967 | Beebe, Jr. et al. | 228/208 |
| 3,970,237 | 7/1976 | Dockus | 228/208 |
| 3,997,099 | 12/1976 | Morisaki | 228/208 |
| 4,011,982 | 3/1977 | Marancik | 228/208 |
| 4,046,304 | 9/1977 | Tabata et al. | 228/235 |
| 4,257,549 | 3/1981 | Bricmont | 228/235 |
| 4,423,120 | 12/1983 | Paulus et al. | 228/116 |

FOREIGN PATENT DOCUMENTS 2805233  8/1979  Fed. Rep. of Germany .................. 228/263.15

Primary Examiner—Nicholas P. Godici
Assistant Examiner—Kurt Rowan
Attorney, Agent, or Firm—E. Philip Koltos; Thomas Zack

[57] ABSTRACT

A method of bonding a first thin crystalline metal to a second thin metal such as metallic glass is disclosed. Initially, the metallic glass is coated with a thin thermal barrier layer. Next, the first metal is heated to a temperature sufficient for diffusion bonding. Finally, the metallic glass is maintained at ambient temperature as the metallic glass is diffusion bonded to the crystalline metal. The thermal barrier layer prevents the metallic glass from reaching a phase transition temperature during the diffusion bonding. Consequently, a composite product having a base layer of crystalline metal and an outer layer of metallic glass is produced. Preferably, the diffusion bonding is produced by evacuated roll-bonding and the coating is attached to the metallic glass by electroplating. A plurality of metallic glass layers and crystalline metal layers can be bonded together to produce a sandwiched composite product.

16 Claims, 4 Drawing Figures

BONDING OF METALLIC GLASS TO CRYSTALLINE METAL

FIELD OF THE INVENTION

The present invention relates generally to the bonding of metals, and more particularly to the bonding of a metallic glass to a crystalline metal.

BACKGROUND OF THE INVENTION

Amorphous metals or metallic glasses have unique properties such as superior resistance to corrosion and wear. Unfortunately, such metallic glasses are extremely limited in their usefulness because they can only be produced in the form of very thin foils or powder. Commercially available amorphous metal strips can be obtained with a thickness of less than 0.003 centimeters. If a means could be provided to bond amorphous metals to thicker crystalline metal substrates, unique products having superior resistance to corrosion and wear and extraordinary tensile strength would be produced.

Currently, materials having generally superior strength and corrosion resistance and high tensile strength can be produced from abundant metals such as iron with the addition of lesser amounts of critical and strategic metals such as cobalt. The use of an amorphous metal layer on an abundant metal as a substitute for those currently produced materials would conserve the critical and strategic metals from which they must be made and reduce dependence on foreign sources for these strategic metals.

A number of methods have been used in the prior art to bond or coat metallic glasses to metal substrates. For example, explosive cladding has been used to bond metallic glasses to a metal substrate. Unfortunately, this is an expensive and specialized procedure warranted by only a few applications. The adiabatic heating associated with this process, and the limited ductility of many glassy alloys, places additional limitations on this procedure. Another method of bonding metallic glasses to metal substrates is sputtering and ion plating. While this technique can provide a glassy coating with good corrosion resistance, the thickness of the coating is usually limited to a few hundred microns. In addition, the use of specialized equipment is required. Electrodeposition has also been used to bond a metallic glass to a metal substrate. However, the deposits formed have not been very corrosion resistant.

Besides the methods mentioned above to bond a metallic glass to a metal substrate, laser glazing has also been used. According to this procedure, a laser on a rotating metallic specimen is used to make a glassy surface layer. The thickness of the glassy layer formed is only about 50 microns, and glassy products are only produced on specialized alloys. Ion implantation techniques are also suitable to bond metallic glasses to metal substrates. However, only thin coatings of 60 microns or less have been produced. In addition, this procedure often results in the formation of microcrystalline materials depending on the alloy used.

Although the above methods can produce a bonding of a metallic glass to a metal substrate, these methods are of limited use and are more effective in producing microcrystalline layers on the crystalline metal rather than glassy surfaces. In addition, the thickness of the metallic glass is severely limited.

The use of conventional hot rolling procedures to clad a metallic glass to a metal substrate has been explored and found to be unworkable. This conclusion is stated in an article entitled "New Class of Corrosion Resistant Coatings" by R. B. Diegle appearing in *SAMPE QUARTERLY*, January, 1982, pages 26–30. In this article, it was found that conventional hot rolling procedures caused the glassy metals to crystallize and/or undergo embrittlement.

SUMMARY OF THE INVENTION

In accordance with the present invention, a method of bonding a first thin metal having a high diffusion bonding temperature to a second thin metal having a low phase transition temperature is disclosed. For example, a crystalline metal having a diffusion bonding temperature in excess of 700 degrees centigrade is bonded to a metallic glass which crystallizes at temperatures of 200–300 degrees centigrade below the temperature required for diffusion bonding. According to the method of the present invention, the crystalline metal is heated to a temperature sufficient for diffusion bonding. The metallic glass is coated with a thin thermal barrier layer, such as nickel by electroplating. The coated metallic glass is initially at ambient temperature as the heated crystalline metal and thermal barrier layer are brought together for diffusion bonding. In this manner, the metallic glass does not exceed the phase transition temperature during the diffusion bonding.

According to the preferred embodiment of the present invention, the diffusion bonding is produced by a roll-bonding procedure in an evacuated chamber. In addition, the two metals to be diffusion bonded are thoroughly cleaned prior to roll-bonding to effect a better diffusion bonding. A suitable crystalline metal is steel and a suitable metallic glass is iron with boron.

The composite product produced by this metal has a high corrosion and wear resistance. In addition, by providing a second metallic glass layer on the other side of the crystalline metal, a composite product having high tensile strength is produced. Further sandwiched layers of crystalline metal and metallic glass are also provided to make a bulk material which is primarily metallic glass.

It is an advantage of the present invention that a product having high corrosion resistance, superior wear resistance, and high tensile strength is produced from readily available materials.

It is a further advantage of the present invention that the equipment necessary to form the composite product is relatively inexpensive, not sophisticated, and readily available.

Other features and advantages of the present invention are stated in or apparent from a detailed description of a presently preferred embodiment of the invention found hereinbelow.

DETAILED DESCRIPTION OF THE PREFERRED EMBODIMENTS

Many commercial amorphous metals or metallic glasses are currently available and typically are produced in five centimeter wide strips having a maximum thickness of 0.003 centimeters. These metallic glass strips must be produced relatively thin because of the very high rates of cooling required to produce an amorphous structure. Due to the extremely thin nature of these strips, they have very limited application.

It is well known that two metals can be bonded together by diffusion bonding such as in a vacuum rolling mill. Typically, the two metals are heated together and rolled, thus effecting the bond. The temperature normally required for bonding is at least 700 degrees centigrade. Unfortunately, most amorphous metals crystallize at temperatures 200 to 300 degrees centigrade lower than the temperature required for such bonding.

Initially, it was supposed that a metallic glass could be diffusion bonded to a crystalline metal substrate by maintaining the metallic glass at room temperature as the metallic glass was introduced together with a heated crystalline metal substrate between the rollers of the rolling mill. Although bonding in this manner was achieved, it was found that the metallic glass transformed into a microcrystalline material and the advantages of a metallic glass were consequently lost.

In accordance with the present invention, a method of preventing the metallic glass from reaching a phase transition temperature where the metallic glass changes to a microcrystallic material or crystalline material is provided. According to the present method, a thermal barrier is placed between the metallic glass and the crystalline metal substrate. The thermal barrier layer prevents the metallic glass from reaching the phase transition temperature, while the thermal barrier layer and metal glass are diffusion bonding to the crystalline metal substrate.

Figure 1:
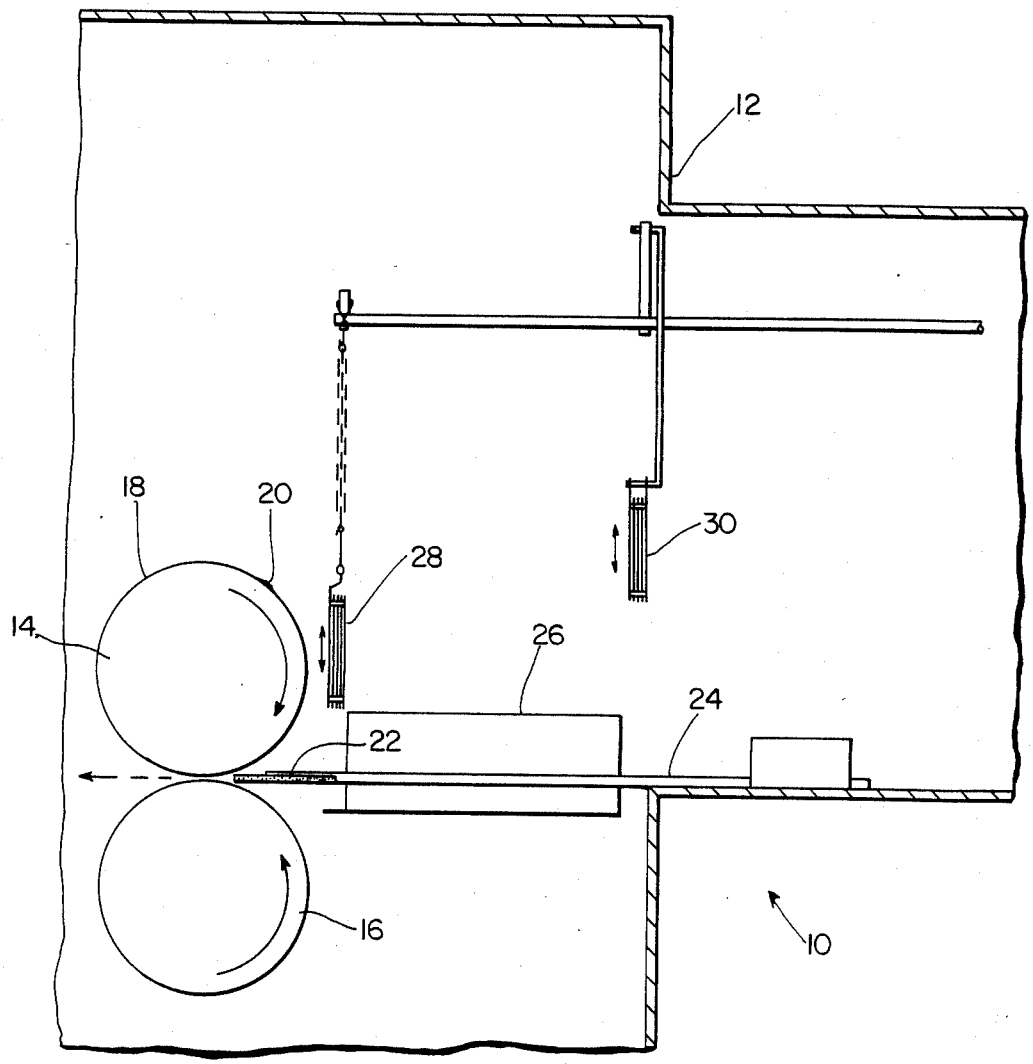
FIG. 1 is a schematic elevation view of a diffusion bonding apparatus used in performing the method of the present invention.

Depicted in FIG. 1 is an evacuated roll-bonding apparatus 10 which is suitable for performing the method of bonding a metallic glass to a crystalline metal according to the present invention. Roll bonding apparatus 10 includes a chamber 12 which is suitably evacuated. Evacuation helps the bonding procedure. Inside of chamber 12 are two opposed rollers 14 and 16. Attached around roller 16 is a thin strip of nickel plated metallic glass 18. Conveniently, nickel plated glass strip 18 is attached to the periphery of roller 14 by tape 20 or the like.

It should be noted that nickel plated metallic strip 18 was initially made from a roll of commercial glass ribbon which was placed in a plating solution after the surface of the ribbon was cleaned. The desired thickness of nickel was electro-deposited on the metallic glass ribbon by using periodic reverse current for a specific length of time. A thickness of between 0.0013 centimeter and 0.03 centimeter is normally plated on the metallic glass ribbon. After plating, the nickel plated glass strip 18 was cleaned in an ultrasonic cleaning bath, washed with alcohol, and blown dry with warm air.

Also depicted in FIG. 1 is a strip 22 of crystalline metal such as mild steel having a thickness of 0.07 centimeters to 0.127 centimeters. Strip 22 rests on a movable tray 24. Movable tray 24 is movable through a heater 26 having doors 28 and 30 at each end. As with nickel plated glass strip 18, crystalline metal strip 22 is suitably cleaned prior to roll-bonding.

According to the method of the present invention, nickel plated glass strip 18 is pressure bonded to crystalline metal strip 22 in the following manner. As described above, a metallic glass strip is nickel plated to produce nickel plated metallic glass strip 18. Glass strip 18 is then attached to roller 14 around the periphery as shown. Conveniently, the ends of glass strip 18 are held together by tape 20. Crystalline metal strip 22 is then placed on movable tray 24 and moved into heater 26. Chamber 12 is then evacuated to a pressure of no more than $2 \times 10^{-5}$ torr. Next, doors 28 and 30 are lowered into position on either end of heater 26.

With doors 28 and 30 in place, heater 26 is actuated to heat crystalline metal strip 22 to a temperature sufficient for diffusion bonding. Where crystalline metal strip is steel, the required temperature for diffusion bonding is normally 900 degrees centigrade to 1200 degrees centigrade. As crystalline metal strip 22 is heated, doors 18 and 20 prevent the heating of the rest of the contents of chamber 12 so that glass strip 18 stays at a substantially ambient temperature, for example, 45 degrees centigrade.

Once crystalline metal strip 22 is heated to the desired temperature, doors 28 and 30 are raised and movable tray 24 is pushed forward to feed heated crystalline metal strip 22 between rollers 14 and 16. As heated crystalline metal strip 22 is fed between rollers 14 and 16, a rolling reduction of between 10 and 30 percent is used to diffusion bond glass strip 18 to crystalline metal strip 22. Composite product 32, shown in phantom, exits from between rollers 14 and 16 and is suitably received or supported.

Figure 2:
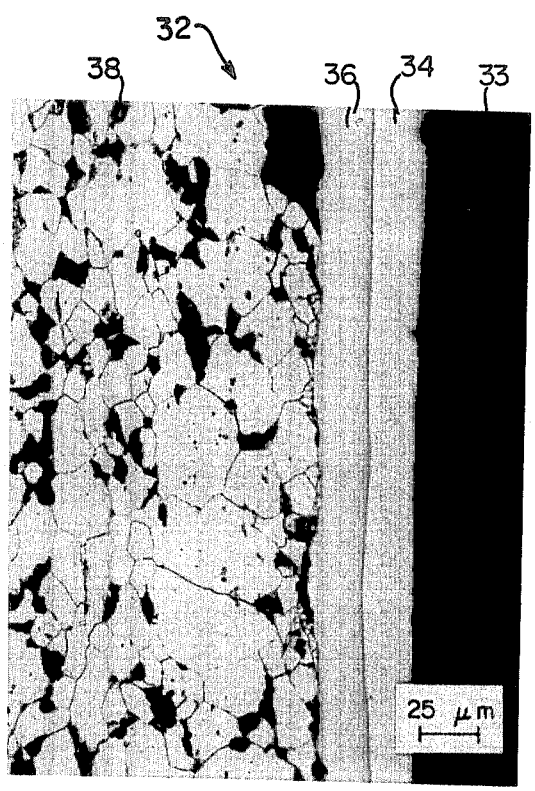
FIG. 2 is a photomicrograph of the composite product of the present invention.

Depicted in FIG. 2 is a photomicrograph of a composite product 32 produced according to the present invention. As shown, composite product 32 includes an outer layer 34 of metallic glass, an intermediate barrier layer 36 of nickel, and an inner crystalline metal layer 38. The dark portion 33 is the epoxy mounting material and is not part of the product. This photomicrograph shows that a good metallurgical bond exists between the interfaces of nickel layer 36 and crystalline metal layer 38, and between nickel layer 36 and metallic glass layer 34. The surface of metallic glass layer 34 was smooth and free from large rips, although some microcracks were evident.

As FIG. 2 indicates, during the diffusion bonding of nickel layer 36 to crystalline metal layer 38, a sufficient temperature exists for a good diffusion bond. However, nickel layer 36 acts as a thermal barrier and prevents metallic glass layer 34 from reaching a temperature at which metallic glass layer 34 undergoes a transition to a crystalline or microcrystalline structure. It is also presumed that the fact that rollers 14 and 16 are also at ambient temperature helps to conduct heat away from crystalline metal layer 38 as diffusion bonding takes place so that metallic glass layer 34 does not reach the transition temperature.

In order to test the method of the present invention, experiments were conducted with a metallic glass ribbon that contained 80 atomic percent iron and 20 atom percent boron. This metallic glass was 0.0025 centimeters thick and 5.08 centimeters wide. A roll fifteen meters long was obtained from commercial sources and was cut into smaller lengths for the experiments.

A forty-eight centimeter length of metallic glass ribbon was prepared for electroplating by lightly sanding on both sides, cleaning in an ultrasonic bath, rinsing with water and alcohol, and air drying. A nickel plating bath was used to plate nickel onto the surface of this metallic glass. The bath contained 608 g/l $NiSO_4.7H_2O$, 69 g/l $NiCl_2.6H_2O$ and 35 g/l $H_3BO_3$. This bath is exemplary and a wide range of plating solutions is possible. The bath used is similar to a Watts plating solution, but has about twice the normal nickel concentration. A nickel anode, a temperature range of 65 to 80 degrees centigrade, and a current density of 0.061 amps/cm$^2$ was used to plate nickel on the metallic glass. As shown in the table below, the thickness of the nickel plate varied from test to test. Samples of 1020 steel measuring 7.62 centimeters by 2.54 centimeters by 0.11 centimeters were used in the experiments. The steel samples and nickel plated glass samples was ultrasonically cleaned, washed with water and alcohol, and air dried before they were inserted into the vacuum rolling chamber.

The nickel plated glass strip was attached with tape to the top of a 15.45 centimeter diameter roll with the metallic glass surface contacting the surface of the roll. The steel substrate specimen was placed on movable tray in the vacuum chamber, and the chamber was pumped down to about $2 \times 10^{-5}$ torr. The steel was heated to the desired temperature, the rolls turned on, and the tray slid forward until the steel made contact with the nickel plate and the rolls. A set of doors in the furnace were in place during heating, thus preventing heating of the nickel plated metallic glass to high temperatures. The temperatures of the rolls were about 45 degrees C. just prior to rolling.

The table below indicates the conditions which were used and the results obtained for several experiments using the apparatus described above. All tests were run in the above described manner, with exception of test 877 where the nickel plated glass strip was not taped to the rolls but was instead inserted between the rolls simultaneously with the steel strip.

| Test No. | Thick. of Ni, cm | Temp. of Steel, °C. | Roll Speed, cm/sec | Final thick., cm | Rolling Reduc., pct | Press., Torr | Bonding | Met. glass after rolling |
|---|---|---|---|---|---|---|---|---|
| 864 | 0.001 | 800 | 10 | 0.104 | 11 | $8 \times 10^{-6}$ | Partial | Amorphous |
| 865 | .001 | 900 | 10 | .104 | 11 | $8 \times 10^{-6}$ | Partial | Amorphous |
| 871 | .007 | 1,150 | 10 | .091 | 13 | $3 \times 10^{-5}$ | Good | Amorphous |
| 870 | .007 | 1,200 | 10 | .091 | 13 | $4 \times 10^{-5}$ | Good | Microcryst. |
| 877 | .015 | 1,150 | 22 | .038 | 28 | $2 \times 10^{-5}$ | Good | Amorphous |

The specimens from test 864, 865, and 871 were shown to have bonded to about 70 percent of the steel surface. Small rips in the glass surface occurred in areas 0.35 centimeters apart. FIG. 2 is a photomicrograph of the specimen in test 864 and shows that a good metallugical bond exists between the nickel/steel and nickel/metallic glass interfaces. The specimens from tests 870 and 877 showed good bonding over 95% of the steel surface. The surface of the metallic glass was smooth and free from large rips, but micro-cracks were evident. Although the metallic glass in test 870 crystallized, the microcrystalline material still had properties that are superior to materials with large grain size.

Figure 3:
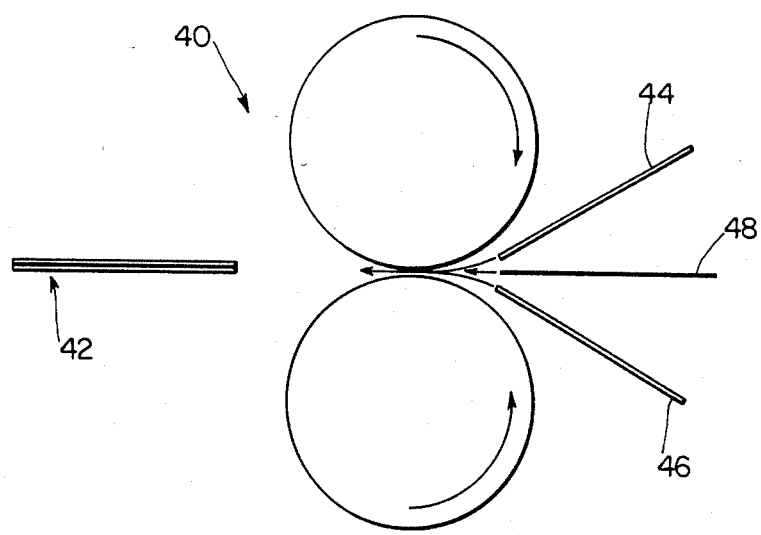
FIG. 3 is a schematic elevation view of a method for producing a sandwiched composite product.

Depicted schmetically in FIG. 3 is a rolling apparatus 40 for producing a sandwiched product 42. Sandwiched product 42 has respective metallic glass layers 44 and 46 on each side of a crystalline metal layer 48.

The method for producing sandwiched product 42 is substantially similar to the method described above for producing composite product 32. However, instead of feeding a single nickel plated metalic glass strip between the two rollers, two such nickel plated metallic glass layers 46 and 44 are fed through the rollers on either side of crystalline metal layer 48. Of course, as with the method described above, crystalline metal layer 48 is heated to the diffusion bonding temperature, and the metallic plated layer of metal glass layers 44 and 46 face toward crystalline metal layer 48. Although rolling apparatus 40 is depicted with layers 44, 46, and 48 being simultaneously introduced between the two rollers, it would be possible, as in FIG. 1 above, to locate metallic glass layers 44 and 46 around the periphery of the two rollers and to then feed heated crystalline metal layer 48 therebetween.

It should be appreciated that in order to produce sandwiched product 42, crystalline metal layer 48 must be relatively thin in order to minimize the percentage of the total product which is crystalline. In addition, by keeping crystalline metal layer 48 relatively thin, this reduces the heat content of crystalline metal layer 48 and helps prevent crystallization of metallic glass layers 44 and 46. It should also be appreciated that sandwiched product 42 has extraordinary tensile strength due to the extordinary tensile strength of metallic glass layers 44 and 46.

Figure 4:
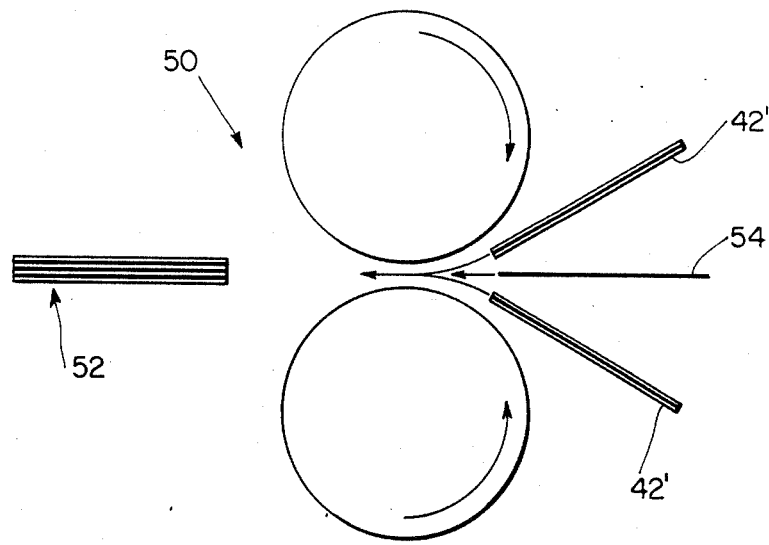
FIG. 4 is a schematic elevation view of a method for producing a multiply sandwiched product.

Depicted schematically in FIG. 4 is a rolling apparatus 50 for producing a multiply sandwiched product 52. According to the method for producing multiply sandwiched product 52, two sandwiched products 42' as described above are used. However, sandwiched products 42' have been additionally nickel plated along a metallic glass surface opposite the middle crystalline metal layer. Thus, as multiply sandwiched products 42' are fed between the two rollers with the nickel plated layer opposite the simultaneously introduced heated crystalline metal layer 54, sandwiched products 42' are diffussion bonded to crystalline metal layer 54 to produce a multiply sandwiched product 52.

It should be appreciated that multiply sandwiched product 52 should be very strong, since the tensile strength of metallic glass is several times that of crystalline metals. The layering of the metallic glass with the more ductile steel and nickel also makes the bulk material more tough, less brittle and more workable than a metal with comparable tensile strength. It should further be appreciated that this building up process can be repeated as many times as needed to make the desired product thickness.

Although the use of a nickel thermal barrier layer has been described above, it should be appreciated that nickel is only one suitable thermal barrier material. Any metallic plate material that adhers to the metallic glass may be used as long as it is still possible to pressure bond this material to the crystalline base metal. The crystalline base metal likewise can be any material suitable for bonding to the thermal barrier layer.

Although the present invention has been described with respect to exemplary embodiments thereof, it will be understood by those of ordinary skill in the art that these and other variations and modifications can be effected within the scope and spirit of the invention.

I claim:

1. A method of bonding a first thin metal having a high diffusion bonding temperature to a second thin metal having a low phase transition temperature substantially below the high diffusion bonding temperature of the first metal, comprising the steps of:
   coating a surface of the second metal with a thin thermal barrier layer;
   heating the first metal separately to a high temperature sufficient for diffusion bonding of the first metal;
   bringing together a heated surface of the first metal and the ambient temperature coated surface of the second metal; and
   diffusion bonding the surface of the heated first metal to the coated surface of the second metal such that the second metal does not exceed the phase transition temperature at any time.

2. A method of bonding as claimed in claim 1 wherein the first metal is a crystalline metal and the second metal is a metallic glass.

3. A method of bonding as claimed in claim 2 wherein the diffusion bonding is produced by rolling the two metals between rollers at ambient temperature.

4. A method of bonding as claimed in claim 3 wherein the coating is produced by electroplating.

5. A method of bonding as claimed in claim 4 wherein the roll-bonding occurs in a chamber, and further including the steps of evacuating the chamber before roll-bonding the two metals.

6. A method of bonding as claimed in claim 5 and further including the step of removing any impurities from the two metals prior to roll-bonding.

7. A method of bonding as claimed in claim 6 wherein the removing of impurities from the two metals includes the steps of cleaning in an ultrasonic bath, washing with alcohol, and blow drying with warm air.

8. A method of bonding as claimed in claim 6 wherein the barrier layer is nickel.

9. A method of bonding as claimed in claim 8 wherein the first metal is steel and the second metal is iron with boron.

10. A method of bonding as claimed in claim 5 wherein two second thin metals are coated on a surface with a thin thermal barrier layer, and wherein the heated first metal is roll bonded between opposed layers of the two second metals so at ambient temperature that two sides of the first metal are covered by the second metal to produce a sandwiched product.

11. A method of bonding as claimed in claim 10 wherein the two second metals are each coated on opposed sides, wherein two such layered products are produced, and wherein the two layered products at ambient temperature are roll bonded to another heated first metal to produce a multiply sandwiched product.

12. A composite product by the process of claim 1 having high strength and corrosion resistance comprising:
   a thin outer layer of metallic glass;
   a thin intermediate layer of a thermal barrier material which is plated to said outer layer; and
   a thin base layer of crystalline metal to which said outer layer is attached by diffusion bonding as said intermediate layer is at ambient temperature and said base layer is at a temperature sufficient for diffusion bonding.

13. A composite product by process as claimed in claim 12 wherein the diffusion bonding is achieved by vacuum roll-bonding.

14. A composite product by process as claimed in claim 13 and further including a further outer layer of metallic glass to which a further intermediate layer of a thermal barrier material has been attached by plating, said further intermediate layer also being simultaneously roll-bonded at ambient temperature to the opposite side of said base layer of crystalline metal such that the composite product has a crystalline metal layer sandwiched between two metallic glass layers.

15. A composite product by process as claimed in claim 14 and further including
   two sandwiched composite products:
   another intermediate layer of a thermal-barrier material which is attached to a respective outer surface of each said sandwiched composite product; and
   a further base layer of crystalline metal on each side of which said respective sandwiched products are attached by heating said further base to a temperature sufficient for diffusion bonding and subsequently roll-bonding both of said another intermediate layers which are both at ambient temperature to opposite sides of said further base layer of crystalline metal such that the composite product has three crystalline metal layers sandwiched between metallic glass layers.

16. A composite product by process as claimed in claim 13 and further including
   a plurality of outer layers;
   a plurality of intermediate layers attached to a respective outer layer; and
   a plurality of base layers, each of said base layers being sandwiched between respective said outer layers which are attached to respective said base layers by heating said respective base layer to a temperature sufficient for diffusion bonding and subsequently roll-bonding a respective said intermediate layer at ambient temperature to a respective said heated base layer.

* * * * *